US005266155A

United States Patent [19]

Gray

[11] Patent Number: 5,266,155

[45] Date of Patent: Nov. 30, 1993

[54] METHOD FOR MAKING A SYMMETRICAL LAYERED THIN FILM EDGE FIELD-EMITTER-ARRAY

[75] Inventor: Henry F. Gray, Alexandria, Va.

[73] Assignee: The United States of America as represented by the Secretary of the Navy, Washington, D.C.

[21] Appl. No.: 983,356

[22] Filed: Nov. 30, 1992

Related U.S. Application Data

[62] Division of Ser. No. 535,612, Jun. 8, 1990, Pat. No. 5,214,347.

[51] Int. Cl.[5] .......................... B44C 1/22; C23F 1/00; C03C 15/00; C03C 25/06

[52] U.S. Cl. .................................... 156/651; 156/644; 156/657; 156/656; 156/662; 437/195; 437/228

[58] Field of Search ............... 156/630, 633, 634, 643, 156/644, 651, 652, 653, 655, 656, 657, 659.1, 662, 668, 648; 437/195, 228, 235, 238, 241; 313/306, 309, 351, 355; 445/35, 46

[56] References Cited

U.S. PATENT DOCUMENTS 3,753,022 8/1973 Fraser, Jr. ............................ 313/78
3,755,704 8/1973 Spindt et al. ........................ 313/309
4,307,507 12/1981 Gray et al. ........................... 29/580
4,498,952 2/1985 Christensen ......................... 156/643
4,578,614 3/1986 Gray et al. .......................... 313/309
4,728,851 3/1988 Lambe ................................ 313/309
4,827,177 5/1989 Lee et al. ............................ 313/306

FOREIGN PATENT DOCUMENTS 0855782 8/1981 U.S.S.R. ............................ 313/336

*Primary Examiner*—William A. Powell
*Attorney, Agent, or Firm*—Thomas E. McDonnell; George Jameson

[57] ABSTRACT

A field-emitter-array device includes a substrate supporting thin-film layers of conductive material and intervening thin-film layers of insulative material. The lateral edges of the thin-film layers form a field emitter array including a field-emitter edge electrode interposed between a pair of control electrodes. The control electrode edges produce a symmetric field causing the flow of field emitted electrons to be substantially parallel to the plane of the control and field-emitter edge electrodes. The direction of electron flow can be further controlled by additional electrodes in the form of additional thin-film conductive layers or external electrodes. A process for making the emitter device includes forming on a support member a plurality of planar first and second thin-film layers of insulative material alternately disposed between first, second and third thin-film layers of conductive material, forming a channel through the thickness of the layers and oriented perpendicular thereto, exposing the lateral edges of the layers of conductive and insulative materials adjacent to the channel to form a field emitter edge electrode interposed between a pair of control electrodes. Additional electrodes may be provided to form and deflect the electron flow.

16 Claims, 4 Drawing Sheets

METHOD FOR MAKING A SYMMETRICAL LAYERED THIN FILM EDGE FIELD-EMITTER-ARRAY

This is a division of co-pending application Ser. No. 07/535,612, filed on Jun. 8, 1990, now U.S. Pat. No. 5,214,347.

BACKGROUND OF THE INVENTION

1. Field of the Invention

The invention relates generally to a field emitter array and, more particularly, to a symmetrical layered thin film edge field-emitter-array and a method for its production using thin-film and microelectronics fabrication and processing techniques.

2. Prior Art

Field-emitter-array electron sources and devices have been described essentially as being vertical devices in that the electrons are emitted from structures, such as points, wedges, "razor blades", in which the emission symmetry direction is normal, i.e., perpendicular, to the plane of the extraction grid or gate. These cold electron sources and devices can be made by a variety of known methods. All the known devices and fabrication methods rely on critical horizontal dimensional tolerances, and frequently on critical non-standard vacuum evaporation techniques or on difficult chemical etching procedures which are orientation-dependent. Often, they rely on micron and submicron lithography, usually electron beam lithography, to control the radius of curvature of each vertical emitter and/or to form the pointed or wedge structures. High resolution lithography is also required to form apertures in the extraction electrodes the extraction of the electrons.

The techniques also usually depend on using single-crystal materials, e.g., silicon. Making large-size devices using these techniques is, at best, very difficult.

Furthermore, the known techniques require careful alignment or centering of the extraction aperture over the field emitter point or wedge, even though some of the reported processes use some sort of self-alignment procedure. Precision lithography is needed to correctly position the aperture holes relative to the emitters.

Another problem arises in the operation of prior-art devices: how can the current flow from the field emitter array be controlled without the extraction electrodes intercepting the current?.

The following U.S. patents illustrate some of the foregoing problems and shortcomings of the prior art: Spindt et al. U.S. Pat. No. 3,755,704, Gray et al. U.S. Pat. No. 4,307,507, Christensen U.S. Pat. No. 4,498,952 and Lee et al. U.S. Pat. No. 4,827,177.

Spindt et al. discloses a technique for forming sharp-point emitters using metal and insulator films on a silicon substrate. An array of holes is formed through the upper metal and insulator films. Electrode material is deposited into each hole, normal to the surface. An evaporated aperture closure material is deposited on the same surface, at a shallow grazing angle from all sides of each hole, either with multiple distributed sources of the closure material, or using a single source and rotating the substrate. The size of each hole is gradually reduced, to limit the amount of electrode material passing through the aperture. In this way. emitters of a conical shape are formed.

While Spindt et al. starts with a thin-film laminate to form a field emitter array, and discloses one approach to the problem of alignment of the emitter with the aperture in the control electrode gate, the emitters are still disposed perpendicularly relative to control electrode and the flow of electrons is normal to the control electrode or extraction grid.

Christensen describes a semiconductor-type process for fabricating a field emitter array from vertically-stacked thin films of alternating conductive and insulative layers. The resulting "optics" formed by the conductive layers modulate, deflect and focus the electron beams. These layers are aligned on a common axis above conical vertical emitters. As in Spindt et al., the electron flow from each emitter is normal to the control electrodes.

Lee et al. describes a single, co-planar thin-film field-emitter structure in which the emitter, control and anode electrodes are formed in the same plane from a single metallic layer. The electrodes are not formed from alternate vertically stacked metallic layers, as in the above patents. High gate interception of electrons results from this design.

Gray et al. discloses a method of making a field emitter structure in which a mold of the desired configuration is formed by the orientation-dependent etching of a single-crystal substrate through a perforated mask. The substrate is next coated with a material capable of emitting electrons under the influence of an electric field, and the substrate forming the mold is then partially or completely removed by etching to expose a plurality of sharp field emitter tips. The resulting field emitter structures can be made in flexible sheets which can be formed into appropriately-shaped cathodes for any desired electron gun design. As in the above patents, the emitters are disposed perpendicularly, and the electron flow is normal to the control electrodes.

Thus, while thin-film and microelectronics fabrication and processing techniques have been used in making field emitter arrays, the resulting devices are still essentially vertical devices with the electron flow being normal to the plane of the extraction electrode, or they are single-film co-planar devices.

SUMMARY OF THE INVENTION

Among the objects of the invention is to provide a method for manufacturing a very low-cost, very large area, thin-film edge field-emitter-array using standard thin-film and microelectronics processing and fabrication techniques, including standard optical lithography. The device and production method of the present invention do not depend on single-crystal silicon or any other semi-conductor substrate material; the substrate can be any flat material, conductive or non-conductive. As such the device can be made large in area, be physically flexible, contain directly addressable elements, contain integral focus and deflection electrodes, and can include all drive and control circuitry on the same substrate.

Another object of the invention is to provide a symmetrical or quasi-symmetrical thin-film edge field-emitter-array.

Another object of the present invention is to provide a field emitter array and a method for its production in which the emitter and extraction electrodes are vertically positioned with respect to each other by the selective deposition of conductive and non-conductive layers on a substrate. The extraction electrodes are substantially symmetrical layers deposited on both sides (top and bottom) of the thin-film emitter layer in order that the electrons can be extracted from the emitter edge without the electrons being collected by these extraction electrodes. Additional bias elements can be added to direct the electron stream in any of several directions.

Another object of the invention is to provide a field-emitter-array and a method for its production in which the radius of curvature of the emitter is controlled by the thickness of the emitter film during the deposition process which forms of the emitter layer edge. The sharpness of the radius of the curvature of the emitter is controlled by the thinness of the thin film edge of the emitter. This edge emitter/control electrode device is totally different from the prior art, e.g., wedge or point-shaped emitters or single thin-film emitters.

A further object of the present invention is to provide a field emitter array capable of operation at extremely low voltages, perhaps even as low as 10 volts. It is also projected that the array can operate at ultra-high frequencies, above 100 Ghz, because the transit times can be very small due to the small vertical spacings. The array can be an electron source, with current densities exceeding 1000 amperes/cm$^2$.

These and other objects of the invention are achieved in a layered thin-film field-emitter-array in which an electron emitter in the form of a thin layer of conductive material is sandwiched between layers of thin conductive film forming the extraction gate, with intervening layers of insulating material forming the gate insulator, disposed on either side of the emitter layer. The laminate formed by these layers is supported on a substrate. A conductor forming the anode electrode can be positioned opposite the lateral edges of the emitter and gate electrodes. Electrons emitted by the emitter are attracted to the anode, and the symmetrical vertical positioning of the gate electrodes on each side of the emitter causes the electrons to flow parallel to the plane of the gate.

Additional insulating and conducting layers can be added to form electron focussing and deflection electrodes, electron modulating structures, etc.

The new method for producing the field emitter array uses thin-film deposition techniques to form the alternating thin layers of insulating and conductive materials on the substrate. Known etching and optical lithography procedures are used to form the edges of the electrodes. Critical dimensional control in the field emitter array is achieved by controlling the vertical spacing of the thin-film layers and the thickness of the individual layers.

The resulting field emitter array is an entirely different device from the prior-art devices, is easier to produce, does not require fine-line lithography, is very reproducible and very reliable.

Some of the many potential applications of the invention include flat panel displays for gun sights, fighter aircraft fire control equipment, command, control and communication (C$^3$) applications, satellite communications, jamming devices, transmit/receive (T/R) switches, laser injectors, free electron laser cathodes, traveling wave tube (TWT)-cathodes, lasertron electron sources, laser gyro pumps, large flat panel TVs and computer monitors, projection lamps, high brightness flat light sources (bulbs), x-ray generators, cooker tubes, microwave and millimeter wave sources, ultra-radiation-hard integrated circuits, protective electronic elements, fast digital switches for signal and data processing, electron sources for a variety of scientific instrumentation such as mass spectrometers, scanning electron microscopes (SEMs), transmission electron microscopes (TEMs), electron guns of all types electron beam welders, ion gauges, multi-cathode cathode ray tubes (CRTs), multi-beam electron lithography equipment, high temperature electronics, etc.

DETAILED DESCRIPTION OF THE INVENTION

The new fabrication and manufacturing process for producing the present field-emitter-array relies on standard thin-film, fabrication, etching, optical lithography, and metal/insulator deposition procedures. The essential dimensional control is achieved by controling the vertical spacing of the thin-film layers and the thickness of the individual layers, a task that is relatively simple of attainment in microelectronics technology. A second essential condition is to make the electrostatic field symmetrical about the electron emitter in order to minimize or eliminate the real macroscopic electrostatic forces on the thin electron field emitter. Without this symmetry, the electron emitter film would bend and break.

Figure 1:
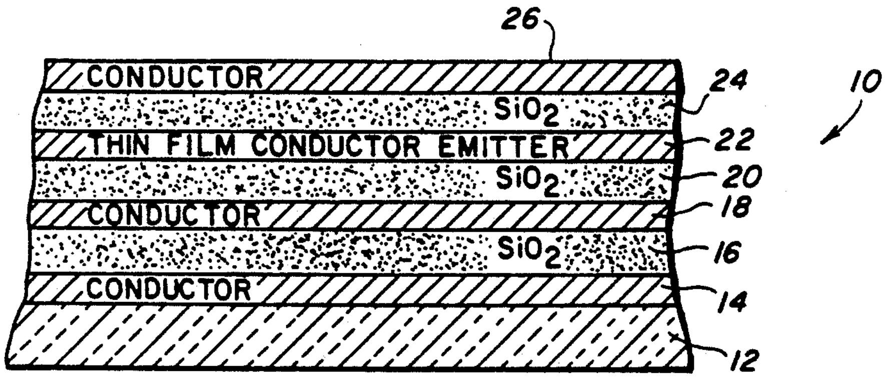
FIG. 1 schematically shows a cross section of the basic laminate structure produced by the method of the present invention.

The device structure can be embodied in a large number of designs, only some of which are described below. FIG. 1 of the drawings schematically shows a cross section of a portion of a laminate 10 made in accordance with the method of the present invention, and from which the field-emitter-array is fabricated. A flat substrate 12 of any size and any material is chosen, which may be a conducting, non-conducting, semi-conducting or semi-insulating material. If the substrate 12 is other than a conducting material, a thin film 14 of conducting material is deposited on the surface of the substrate. If the substrate is a conducting material, then the film 14 may be omitted.

In this regard, the conductive film 14 is an optional, and not a required, element. It may be provided as protection, to hold the potential constant and prevent voltage breakdown or noise. If provided, it can be used in some configurations of the thin-film edge field-emitter-array as a "pusher" electrode, as described later.

As used herein, the term "substrate" refers to a support or foundation for one or more layers which are superposed thereon. The term is not intended to define, limit or otherwise restrict the orientation or mode of operation of the device.

A layer 16 of insulating material is then deposited over the conducting film 14, and can be $SiO_2$, $Si_3N_4$, glass, polyamide, or any other insulator or dielectric. A layer 18 of conducting material is then deposited over the layer 16 of insulator material, and can be relatively thick.

A film 20 of insulating material is deposited over the conducting layer 18 to form one part of the gate insulator. Another thin layer 22 of conducting material is deposited over the insulator 20, and forms the electron emitting material or emitter. The thickness of the layer 22 determines the radius of curvature of the eventual field emitter (at least in this first implementation). A third layer 24 of insulating material is then deposited over the emitter layer 22, and has essentially the same thickness as the second insulator layer 20. Layer 24 is the second insulator layer to form the gate insulator.

Another layer 26 of conducting material is deposited over the layer 24 of insulating material. Layer 26 should be relatively thick, of approximately the same thickness as layer 18, because its eventual radius of curvature at the edge can not be small and it must be mechanically robust.

The foregoing alternating conductor and insulator layers may be formed by any thin-film technique, such as spin deposition, chemical vapor deposition, sputtering, thermal or electron-beam evaporation, wet chemical plating, etc.

By way of example only, illustrative thicknesses of the aforesaid layers may be as follows: the substrate 12, between 10–50 micrometers; conductor 14, between 0.1–0.5 micrometers; insulator 16, between 1–2 micrometers; conductors 18 and 26, approximately 0.5 micrometers; insulators 20 and 24, approximately 0.2 micrometers; and the emitter conductor, approximately 0.02 micrometers. Of course, the layers are not shown to scale in the drawings.

Figure 2:
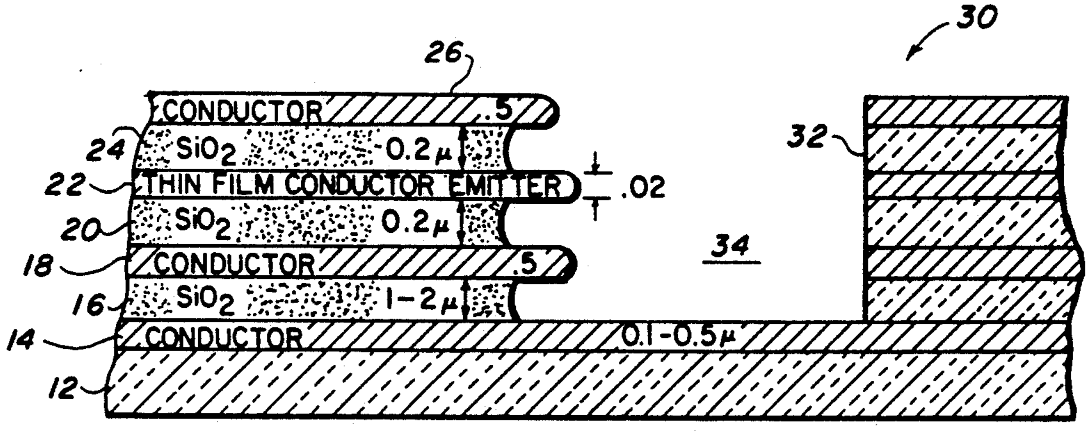
FIG. 2 schematically shows, in cross section, a basic thin film field emitter array of the present invention.

Optical lithography and wet etching (or ion sputtering) of the conductor and insulator layers 16–26 can be used to define and create the basic symmetric thin-film edge field-emitter-array structure 30 shown in FIG. 2, wherein a vacuum channel 34 has been formed through the thickness of the laminate, from the top conductor layer 26 to the lowermost conductor layer 14, or to the surface of the substrate 12 if the substrate is of conductor material. Although not shown, the vacuum channel 34 can also be formed all the way into or through the substrate 12 to form a deep channel which extends below the layer 14. By way of example, the width of the vacuum channel 34 may be 1–2 micrometers, from the edge of the emitter layer 22 and conductor layers 18 and 26, to the edge of the right side 32. Note that the right side 32 of the structure, across the vacuum channel 34, is not defined at this point. It can be removed, masked off, covered, disconnected electrically, etc.

Figure 3:
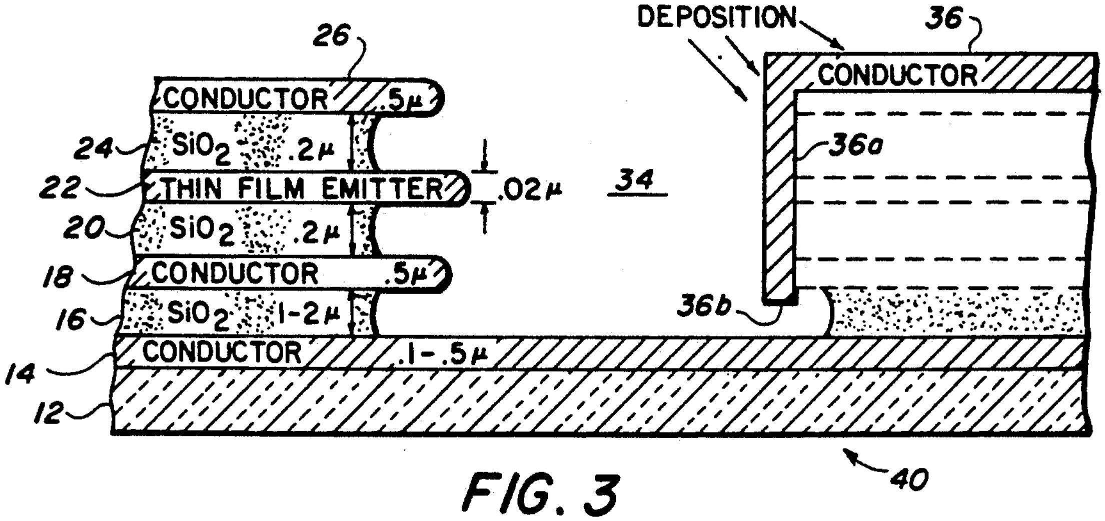
FIG. 3 shows one possible configuration of the basic thin film field emitter array.

The basic device 30 can now be made into a planar vacuum transistor structure similar to that disclosed in U.S. Pat. No. 4,578,614, or it can be used as an electron source for a flat panel display, electron injector, cathode, etc. FIG. 3 shows that the use of standard oblique angle deposition of metal on the side 32 to form a conductor 36, and the use of standard optical lithography and resist methods result in an ultra-high speed electronic switch type structure 40 of submicron dimensions. The conductor 36 extends the height or thickness of the switch 40 and covers the upper surface on the right side 32 and, in the cross section shown in FIG. 3, is of an L-shape. Portion **36*a* of the conductor 36 may be connected at its lower end 36*b* to the conductor layer 14 or, as shown in FIG. 3**, it may be disconnected.

Figure 4:
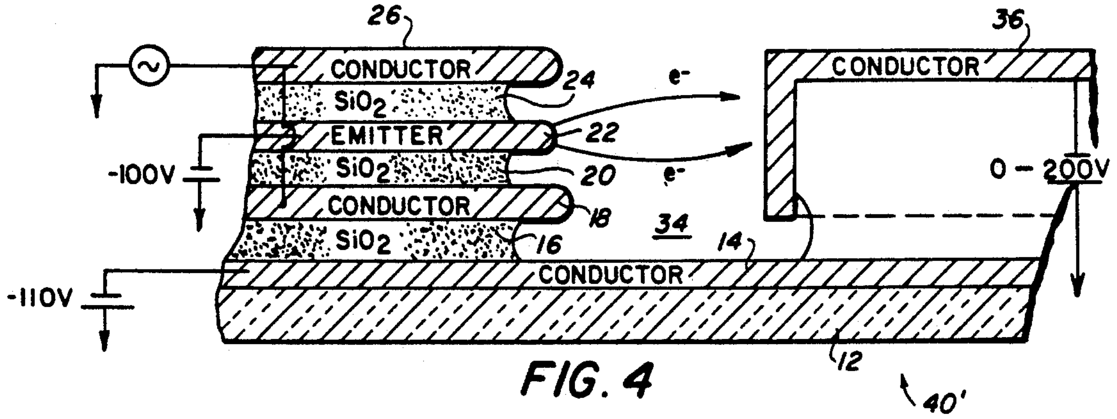
FIGS. 4 and 5 illustrate different ways of applying voltages to the thin film field emitter array.

Voltages can be applied to the various electrodes, or conductor layers, in a variety of ways, one of which is shown in FIG. 4. Electrons (represented as e−) field emitted by the edge emitter conductor 22 are attracted to the conductor 36. Note that because the spacings between the conductive layers are very small, it is possible to obtain very low total electron transit times, under 100 fs (femtoseconds, i.e., $10^{-15}$ seconds) which should yield a device operable at frequencies over 100 Ghz.

Figure 5:
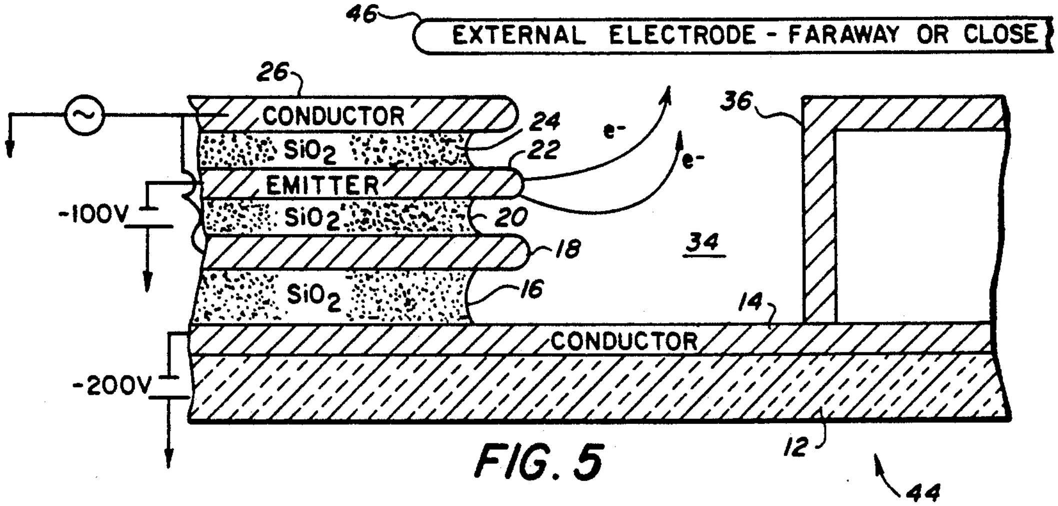

FIG. 5 shows another way of applying voltages to the various electrodes, which results in a very low voltages field-emitter-array electron source 44. Here, the conductor 36 is connected to the conductor 14, and an external conductor 46 is positioned adjacent to the field-emitter-array 44, either close to or far away therefrom. The electrons emitted into the vacuum channel 34 by the emitter conductor 22 are attracted to the external electrode 46.

Figure 6:
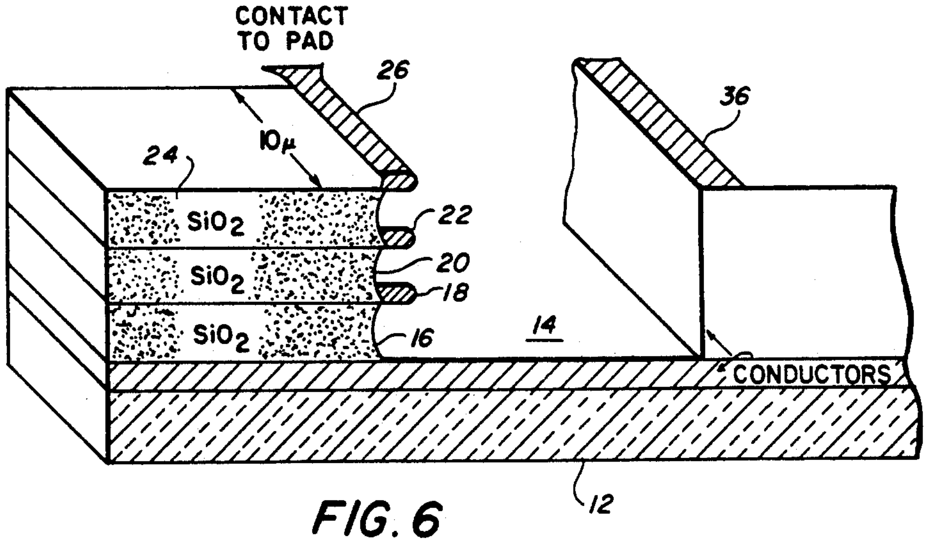
FIGS. 6 and 7 illustrate other embodiments of possible configurations for the field emitter array.

In all the above configurations, the device "metallization" can be patterned in order to minimize unnecessary conductor material, i.e., to minimize capacitance. That is, the conductor elements can be appropriately shaped, in cross section and length, i.e., in the direction perpendicular to the plane of the drawings. One possible configuration is shown in FIG. 6, in which essentially a line source of emitter current is obtained. This configuration is not dissimilar to the gate width of a field effect transistor.

The lateral edges of the conducting layers can also be patterned to form "point-like" field-emitter-arrays in which each "point" or pixel can be individually addressed. A schematic of one possible implementation is shown in FIG. 7, which shows a top or plan view of the upper control electrode 26 in which the electrode 26 is patterned to show narrow edges (E).

Although not visible in FIG. 7, the emitter layer 22, lower control electrode 18, and other conducting layers below it, can be similarly patterned. Any of the conductor layers, or all of them can be patterned, depending upon where it is desired for the electrons to be emitted, and then deflected. It is not necessary to pattern the intervening insulator layers.

It is understood that the patterning process can be conveniently done at the same time that the vacuum channel 34 is formed, leading to the configuration of FIG. 2, as described above.

Figure 7:
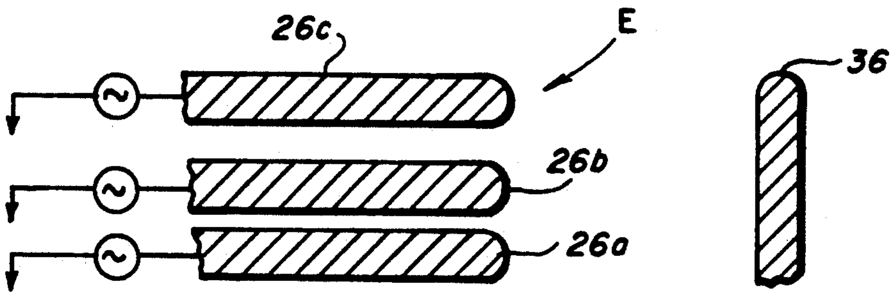

By connecting the individual electrodes to separate, control potentials, as shown in FIG. 7, each "point-like" emitter can be individually addressed.

Because only thin-film technology and standard microelectronic processing and fabrication are needed to manufacture this new device structure, additional insulating and conducting layers can be added to form electron focussing and deflection electrodes, electron modulating structures, millimeterwave and submillimeterwave cavities, electron bunching structures, etc. Furthermore, resistors, transistors, diodes, etc. could be fabricated on the same substrate using integrated circuit concepts.

Figure 8:
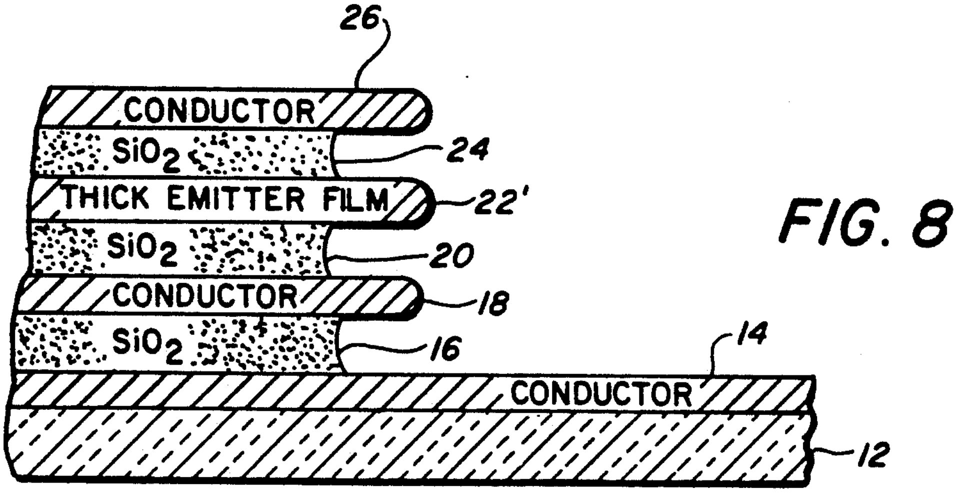
FIGS. 8 and 9 show the technique for fabricating a thin emitter edge from a relatively thick emitter film.
Figure 9:
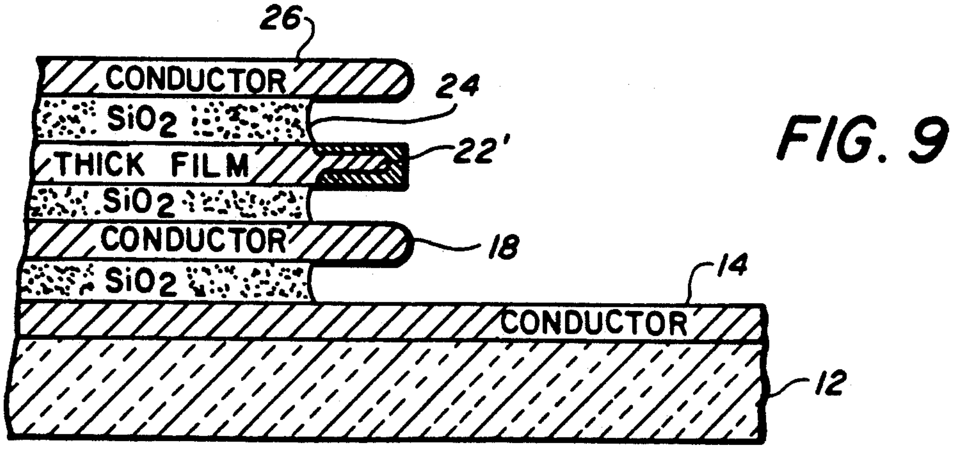

In order to allow more current to flow in the thin film forming the electron field emitter, FIGS. 8 and 9 show how a relatively "thick" emitter film 22′ can be etched to provide a thin emitter edge having a small radius of curvature. Etching of the thick film 22′ (shown in FIG. 8) occurs on all sides and edges, as shown by the arrows in FIG. 9, until the desired thickness and radius of curvature of the edge is obtained along the lateral edge. In FIGS. 8 and 9, the right side of the device has not been shown.

If a tapered field emitter tip is required, a series of resists and etching solutions with the required etching ratios are used. These techniques are known and are not described here.

The conducting electron emitter layer 22 could be of a semi-conductor material in order to take advantage of velocity saturation current limiting, or it could be a superconducting material in order to minimize RC time constants. In fact, any or all conducting materials in the device configurations described above could be fabricated using superconducting materials to minimize or eliminate dispersion of a propagating electromagnetic signal.

The foregoing device structures can also be made by compound semiconductors and superlayer techniques, e.g., molecular beam epitaxy. In this way the semi-insulating properties, e.g., GaAs, can be exploited as well as the high mobility of doped superlayers. That is, the insulators described above and shown in the drawings can be replaced by semi-insulating compound semiconductors, e.g., GaAs, and the conductors can be replaced by epitaxial layers of doped compound semiconductors, e.g., GaAs or GaAlAs. High temperature superconductors also can be used for all the conductor materials, thereby significantly reducing RC time constants, power consumption and phase dispersion.

Figure 10:
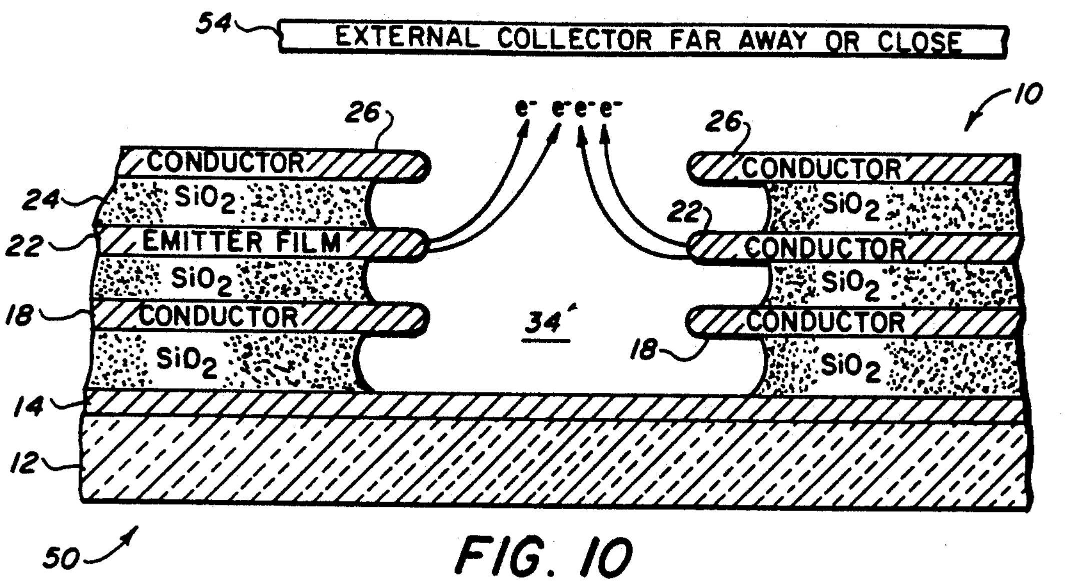
FIGS. 10 and 11 show yet other possible configurations for the field emitter array of the present invention.
Figure 11:
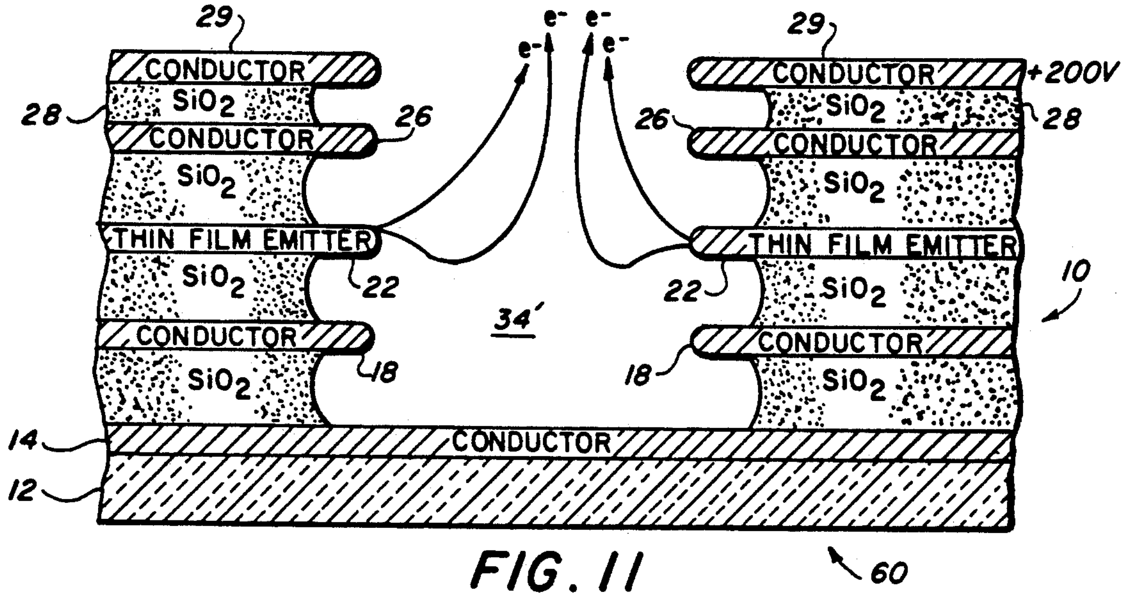

Perhaps, the most important configurations for the device disclosed herein are the use of double-sided, horizontal injection configuration and the use of additional electron removal electrodes, which are shown in FIGS. 10 and 11. FIG. 10 shows the double-sided, horizontal injection configuration 50 in which the same, simple thin film manufacturing processing is used. However, in this configuration, no oblique angle metal deposition is needed. A vacuum channel 34' is formed through the thickness of the laminate 10, as described above, to create the left and right sides of the configuration. Electrons are field emitted from both the left and right sides into the vacuum channel 34' provided between them, and these electrons are "pushed" out of the channel by the lower conducting thin-film 14 acting as a "pusher" electrode and by the externally applied potential (not shown) on collector 54, such as described in U.S. Pat. No. 4,578,614.

FIG. 11 shows a device structure similar to that of FIG. 10, but with one additional insulator layer 28 and an additional conductor layer 29 on top of the conductor layer 26 to provide additional focussing or deflection fields. Obviously, these fields can be obtained not only from this type of electrode but other types, such as electrodes far to either side of the emitter structure (see U.S. Pat. No. 4,578,614), free-standing electrodes such as a phosphor screen, or entrance slits to devices such as TWTs, etc.

Figure 12:
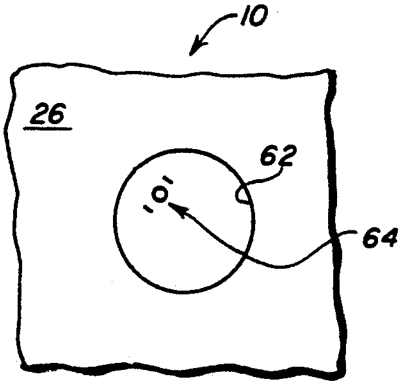
FIG. 12 is a top, or plan, view of another configuration for the field emitter array.

Many other structures can be made, including additional layers of insulators and conductors, both symmetric and nonsymmetric, to provide electron focusing, beam modulation, beam deflection, ion catching, pixel addressability, and shaped beams. For example, the shape of the electron beam, i.e., the shape of the emitter edge and associated extraction electrodes, does not have to be a straight edge. It can be round, weave in a meandering line, etc. That is, the field-emitter-array can be composed of round or annular edge emitters and aperture edges such as defined by a round sputtering beam which sputters through all the upper layers. Or it could be a meandering line interrupted in several locations, such as if made into a warning sign for use in an aircraft cockpit or spelling out "Naval Research Laboratory" in a handwritting format. One of these methods, namely the round hole, is illustrated in FIG. 12, in which the thin-film edge emitter, and all other conductor and non-conductor edges, are formed by "drilling" a hole 62 through the laminate or sandwich structure, such as 10 in FIG. 1. The edges of the hole 62 then define the device structure. Due to the circular configuration, the extraction electrodes direct the electrons at the center of the hole, as schematically shown in FIG. 12 at 64.

Some of the advantages and new features of the manufacturing process and the resulting field-emitter-array of the present invention include:

1. Reliance upon single-crystal substrates is eliminated. Substrates of almost any material and any size can be used, thereby resulting in devices of almost any size, e.g., large, flat TVs and monitors.

2. Critical spacing is determined by controlling the thicknesses of the individual insulator and conductor layers, a relatively easy task. Thus, high spatial resolution lithography is not required to obtain the desired spatial tolerances and sharp radii of curvature of the electron field emitter.

3. Critical alignment of aperture to field emitter is eliminated.

4. Critical re-registration of electrodes is eliminated.

5. The structures can be made in thin sheet form, thereby permitting physically flexible electron sources and devices such as "wrap-around" displays for cockpits, cylindrical "hollow" electron sources for high power microwave tubes, flat or cylindrical light bulbs, deformable cathodes, such as for convergence requirements of Pierce type electron gun/cathode applications, etc.

6. Ultra-low voltage operation is permitted, perhaps as low as 10 V.

7. Ultra-high frequencies are allowed due to the small electrode spacings, possibly above 100 Ghz.

8. Easy pixel addressability and patterning is possible.

9. Quasi-planar processing is possible. (Vertical layer spacings do not have to be exactly symmetrical).

10. Entire fabrication and processing is simpler.

11. Back ion bombardment damage is minimized for at least two reasons: (1) low voltages can be used for electron extraction; and (2) the emitter film edge or points are not in direct line-of-sight with the collector in those cases where electrons are injected into a high voltage region, e.g., to a phosphorized panel, amplified wave guide, microwave cavity, TWT, etc. Furthermore, the extraction gate or grid essentially shields the emitter film.

It is understood that many changes and additional modifications of the invention are possible in view of the teachings herein without departing from the scope of the invention as defined in the appended claims.

I claim:

1. A process for making a symmetrical layered thin-film edge field-emitter-array device comprising the steps of:

forming on a support member a plurality of planar thin-film layers including first and second layers of insulative material on parallel planes alternatively disposed between first, second and third layers of conductive material on parallel planes;

forming a channel substantially through the thickness of said plurality of thin-film layers and oriented substantially perpendicular to said layers on the surface of said support member; and exposing the lateral edges of said first, second and third layers of conductive material adjacent to said channel to form first, second and third electrodes extending into said channel, said second electrode being the edge of a field-emitter electrode and said first and third electrodes being control edge electrodes symmetrically disposed on each side of the emitter electrode.

2. A process as defined in claim 1, wherein said support member is of a conductive material, said process further including the step:

forming a third layer of insulative material on said support member.

3. A process as defined in claim 1, wherein said support member is of a non-conductive material, and further comprising the step:

providing a fourth thin-film conductive layer on the supporting surface of said support member; and providing a third layer of insulative material on the fourth thin-film conductive layer.

4. A process as defined in claim 1, further including providing an electron removal electrode adapted to deflect the flow of electrons.

5. A process as defined in claim 4, wherein said electron removal electrode is provided by a further thin-film layer of insulative material on the layer of conductive material furthest from said support member and a further layer of conductive material on said further layer of insulative material.

6. A process as defined in claim 4, wherein said electron removal electrode is provided by an external electrode spaced from the layer of conductive material furthest from said support member.

7. A process as defined in claim 1, wherein said step of exposing the lateral edges of said layers of conductive material includes exposing the lateral edges of said first, second and third layers of conductive material on both sides of said channel to form pairs of spaced, horizontally-aligned electrodes extending into said channel.

8. A process as defined in claim 1, further including forming at least one of said first, second and third layers of conductive material into a plurality of separate in-plane segments, with one end portion of each segment extending into said channel.

9. A process as defined in claim 4, further including forming at least one of said first, second and third layers of conductive material into a plurality of separate in-plane segments, with one end portion of each segment extending into said channel from both sides.

10. A process as defined in claim 5, further including forming at least one of said first, second and third layers of conductive material into a plurality of separate in-plane segments, with one end portion of each segment extending into said channel from both sides.

11. A process as defined in claim 6, further including forming at least one of said first, second and third layers of conductive material into a plurality of separate in-plane segments, with one end portion of each segment extending into said channel from both sides.

12. A process as defined in claim 1, wherein said step of exposing the lateral edges of said layers of conductive material includes exposing the lateral edges of said first, second and third layers of conductive material on both sides of said channel to form pairs of spaced electrodes extending into said channel.

13. A process as defined in claim 12, further including forming at least one of said first, second and third layers of conductive material into a plurality of separate in-plane segments, with one end portion of each segment extending into said channel from both sides.

14. A process as defined in claim 13, further including providing an electron removal electrode adapted to deflect the flow of electrons from said channel.

15. A process as defined in claim 14, wherein said electron removal electrode is provided by a further thin-film layer of insulative material on the layer of conductive material furthest from said support member and a further layer of conductive material on said further layer of insulative material, said electron removal electrode being provided on both sides of said channel.

16. A process as defined in claim 14, wherein said electron removal electrode is provided by an external electrode spaced from the layer of conductive material furthest from said support member.

* * * * *